(12) United States Patent
Sakai et al.

(10) Patent No.: US 8,517,876 B2
(45) Date of Patent: Aug. 27, 2013

(54) AUTOMATIC TRANSMISSION FOR HYBRID VEHICLE

(75) Inventors: Atsuhiro Sakai, Saitama (JP); Noriyuki Abe, Saitama (JP); Teruo Nagahama, Saitama (JP); Nobuhiro Kumagai, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 99 days.

(21) Appl. No.: 13/318,755

(22) PCT Filed: Mar. 25, 2010

(86) PCT No.: PCT/JP2010/055220
§ 371 (c)(1),
(2), (4) Date: Nov. 3, 2011

(87) PCT Pub. No.: WO2010/143463
PCT Pub. Date: Dec. 16, 2010

(65) Prior Publication Data
US 2012/0115677 A1   May 10, 2012

(30) Foreign Application Priority Data
Jun. 10, 2009 (JP) ................................ 2009-138930

(51) Int. Cl.
*F16H 3/72* (2006.01)
(52) U.S. Cl.
USPC .......................................................... 475/5
(58) Field of Classification Search
USPC .......................... 475/5, 8, 207, 221, 317, 318
See application file for complete search history.

(56) References Cited

U.S. PATENT DOCUMENTS

| 7,575,529 | B2* | 8/2009 | Holmes ............................... 475/5 |
| 8,231,491 | B2* | 7/2012 | Oba et al. ............................ 475/5 |
| 8,241,161 | B2* | 8/2012 | Schoenek ............................ 475/5 |
| 2007/0265126 | A1* | 11/2007 | Janson et al. ...................... 475/5 |
| 2009/0098969 | A1* | 4/2009 | Tabata et al. ....................... 475/5 |
| 2011/0183802 | A1* | 7/2011 | Fuechtner ........................... 475/5 |
| 2012/0021861 | A1* | 1/2012 | Sakai et al. ........................ 475/5 |
| 2012/0310462 | A1* | 12/2012 | Kuroda et al. ................... 701/22 |

FOREIGN PATENT DOCUMENTS

| JP | 2002-204504 A | 7/2002 |
| JP | 3647399 B2 | 5/2005 |
| JP | 2005-329813 A | 12/2005 |
| JP | 2007-246057 A | 9/2007 |
| JP | 2009-83520 A | 4/2009 |
| WO | WO 2009/041553 A1 | 4/2009 |

\* cited by examiner

*Primary Examiner* — David D Le
*Assistant Examiner* — David J Hlavka
(74) *Attorney, Agent, or Firm* — Arent Fox LLP (57) ABSTRACT

An automatic transmission for a hybrid vehicle has a first clutch connecting a first drive gear shaft rotatably supporting drive gears G3a and G5a, to an input shaft, a second clutch connecting a second drive gear shaft, rotatably supporting drive gears G2a and G4a, to the input shaft, a first meshing mechanism connecting the drive gears G3a and G5a to the first drive gear shaft, a second meshing mechanism connecting the drive gears G2a and G4a to the second drive gear shaft, a brake fixing a third element of a planetary gear mechanism to a transmission case, and a switching mechanism switching to where an electric motor is connected to a first element or where the electric motor MG is connected to the third element. The first element and the first drive gear shaft are connected. A second element and the drive gear G3a are connected.

7 Claims, 5 Drawing Sheets

AUTOMATIC TRANSMISSION FOR HYBRID VEHICLE

CROSS-REFERENCE TO RELATED APPLICATION

This application is a National Stage entry of International Application No. PCT/JP2010/055220, having an international filing date of Mar. 25, 2010; which claims priority to Japanese Application No.: 2009-138930, having a filing date of Jun. 10, 2009, the disclosure of each of which is hereby incorporated in its entirety by reference.

TECHNICAL FIELD

The present invention relates to an automatic transmission for a hybrid vehicle provided with an internal combustion engine and an electric motor.

BACKGROUND ART

Hitherto, there has been known an automatic transmission for a hybrid vehicle equipped with an international combustion engine and an electric motor (refer to, for example, Japanese Patent No. 3647399). According to the one disclosed in Japanese Patent No. 3647399, a dual clutch transmission (DCT) is used to employ any one gear train of an even ordinal gear shift stage in a transmission gear ratio rank order to run an electric motor at an appropriate rotational speed so as to carry out regeneration or assist when a vehicle is traveling at an odd ordinal gear shift stage in the transmission gear ratio rank order, or to employ any one gear train of an odd ordinal gear shift stage in a transmission gear ratio rank order to run the electric motor at an appropriate rotational speed so as to carry out regeneration or assist when the vehicle is traveling at an even ordinal gear shift stage in the transmission gear ratio rank order.

DISCLOSURE OF THE INVENTION

Problems to be Solved by the Invention

In a conventional automatic transmission, if, for example, the gear ratio of a gear train of a starting stage is set so as to secure a high driving force at a start to permit a sudden acceleration, then the fuel efficiency at the start deteriorates. On the other hand, if the gear ratio of the gear train of the starting stage is set such that the fuel efficiency at the start improves, then it will be difficult to secure a high driving force, leading to a deteriorated capability of following an operation by a driver (drivability).

In view of the above background, an object of the present invention is to provide an automatic transmission that permits improved the capability of following an operation by a driver (drivability) and also improved fuel efficiency.

Means for Solving the Problems

To fulfill the aforesaid object, the present invention provides an automatic transmission for a hybrid vehicle having an internal combustion engine and an electric motor, which processes the rotation of an input shaft, to which the power of the internal combustion engine is transmitted, into speeds of a plurality of gear shift stages through the intermediary of a plurality of gear trains and outputs the speeds from an output member, the automatic transmission comprising: a first drive gear shaft rotatably supporting a drive gear of each gear train which establishes a gear shift stage of an odd ordinal in a transmission gear ratio rank order; a second drive gear shaft rotatably supporting a drive gear of each gear train which establishes a gear shift stage of an even ordinal in a transmission gear ratio rank order; a first clutch that disconnectably connects the input shaft and the first drive gear shaft; a second clutch that disconnectably connects the input shaft and the second drive gear shaft; a first meshing mechanism, which selectively connects a drive gear of each gear train which establishes a gear shift stage of an odd ordinal in a transmission gear ratio rank order, to the first drive gear shaft; a second meshing mechanism, which selectively connects a drive gear of each gear train which establishes a gear shift stage of an even ordinal in a transmission gear ratio rank order, to the second drive gear shaft; a planetary gear mechanism having three elements, namely, a sun gear, a carrier, and a ring gear; the three elements composed of the sun gear, the carrier, and the ring gear of the planetary gear mechanism being defined as a first element, a second element, and a third element, respectively, in an order of the arrangement at intervals corresponding to gear ratios in a velocity diagram; a brake which disengageably locks the third element to a transmission case; and a mechanism which switches between a state in which a rotor of the electric motor is connected to the first element of the planetary gear mechanism and a state in which the rotor of the electric motor is connected to the third element of the planetary gear mechanism, wherein the first element and the first drive gear shaft are connected, and the second element and one of drive gears rotatably supported by the first drive gear shaft are connected.

According to the present invention, the switching mechanism is capable of switching between the state in which the rotor of the electric motor is connected to the first element of the planetary gear mechanism and the state in which the rotor of the electric motor is connected to the third element of the planetary gear mechanism.

With this arrangement, the switching mechanism is set to the state in which the rotor of the electric motor and the third element of the planetary gear mechanism are connected and the first clutch is engaged thereby to transmit a driving force of the internal combustion engine to the first element of the planetary gear mechanism. This makes it possible to combine the driving force of the electric motor transmitted to the third element and the driving force of the internal combustion engine transmitted to the first element and to output the combined driving force from the output member through the second element and the intermediary of a gear train having a drive gear connected to the second element, thus permitting a higher driving force (torque) at the time of starting a vehicle.

Further, setting the switching mechanism to the state in which the rotor of the electric motor and the first element of the planetary gear mechanism are connected and locking the third element onto the transmission case by the brake make it possible to output, from the output member, the rotational speed of the internal combustion engine, which is transmitted to the first element, in terms of a predetermined output speed set on the basis of a gear ratio of the planetary gear mechanism (the number of teeth of the ring gear/the number of teeth of the sun gear) and a gear ratio of a gear train equipped with a drive gear to be connected to the second element (the number of teeth of a driven gear/the number of teeth of a drive gear).

Thus, setting the gear ratio of the planetary gear mechanism and the gear ratio of the gear train equipped with the drive gear to be connected to the second element such that the priority is placed on fuel efficiency makes it possible to start the vehicle by selecting either one of the aforesaid two ratios according to a drive condition, permitting improved capability of following an operation by the driver (drivability) and higher fuel efficiency.

In the present invention, the switching mechanism is preferably configured to enable switching to a state in which the connection with the first element or the third element of the planetary gear mechanism is cleared. This arrangement allows the electric motor to be completely isolated. Thus, the electric motor can be isolated at every gear shift stage in the case where the electric motor is not in use, thereby making it possible to prevent a drop in fuel efficiency attributable to the inertia of the electric motor.

Further, providing a failure detecting mechanism which detects a failure of the electric motor and setting the switching mechanism to the state in which the connection with the first element or the third element of the planetary gear mechanism is cleared if the failure detecting mechanism detects a failure of the electric motor enable the vehicle to travel on the internal combustion engine without being affected by the electric motor having incurred the failure.

In the present invention, the switching mechanism can be constituted by a switching sleeve, a rod which can be moved forward and backward in the switching sleeve by a direct acting actuator, the switching sleeve and the rotor of the electric motor are connected, the switching sleeve has two, namely, a first and a second, through-holes which penetrate in a radial direction and which are provided with an interval therebetween in the axial direction of the switching sleeve, a first projecting member is internally inserted in the first through-hole, a second projecting member is internally inserted in the second through-hole, an elastic member urging the projecting member inward in the radial direction is disposed in each of the two through-holes, and the rod is provided with a diameter-expanded portion which gradually expands outward in the radial direction so as to form two, namely, a first and a second, tapered surfaces, and the switching mechanism can be configured such that the rod is moved forward or backward by the direct acting actuator to cause the first tapered surface to come in contact with the first projecting member, thus causing the first projecting member to jut out of the switching sleeve outward in the radial direction against an urging force of the elastic member and the first projecting member to engage with a first recessed portion connected to the first element of the planetary gear mechanism thereby causing the switching mechanism to connect the rotor of the electric motor with the first element and the rod is moved backward or forward by the direct acting actuator to cause the second tapered surface to come in contact with the second projecting member, thus causing the second projecting member to jut out of the switching sleeve outward in the radial direction against an urging force of the elastic member and the second projecting member to engage with a second recessed portion connected to the third element of the planetary gear mechanism thereby causing the switching mechanism to connect the rotor of the electric motor with the third element.

Further, in the present invention, the switching mechanism can also be constituted by a switching sleeve and a rod which can be moved forward and backward in the axial direction by a direct acting actuator, a cylindrical grooved cam which switches the forward/backward motion of the rod to a rotational motion, and a cam shaft which is connected to the cylindrical grooved cam and to which two, namely, a first and a second, plate cams are secured, the switching sleeve and the rotor of the electric motor are connected, the switching sleeve is provided with two, namely, a first and a second, through-holes which penetrate in the radial direction and which are provided with an interval therebetween in the axial direction, a first projecting member being internally inserted in the first through-hole, while a second projecting member being internally inserted in the second through-hole, an elastic member urging the projecting member inward in the radial direction is disposed in each of the two through-holes, and the first cam causes the first projecting member to project against the urging force of the elastic member to engage with the first recessed portion, setting the switching mechanism to a state in which the rotor of the electric motor is connected with the first element of the planetary gear mechanism, while the second cam causes the second projecting member to project against the urging force of the elastic member to engage with the second recessed portion, setting the switching mechanism to a state in which the rotor of the electric motor is connected with the third element of the planetary gear mechanism.

Further, in the present invention, in the case where the charging rate of a secondary battery is below a predetermined value and the vehicle is to be started using the driving force of the internal combustion engine, preferably, the switching mechanism is switched to the state wherein the rotor of the electric motor is connected to the third element of the planetary gear mechanism, the first clutch is engaged thereby to transmit the driving force of the internal combustion engine to the first element of the planetary gear mechanism, and the rotation of the third element that reversely rotates (rotates in the reverse direction) is restrained when power is output from the output member through the intermediary of the second element and a gear train having a drive gear connected thereto.

With this arrangement, the vehicle can be started by the driving force of the internal combustion engine while generating electric power by the electric motor and carrying out regeneration for charging the secondary battery.

Further, according to the present invention, in the case where the vehicle is traveling at a low speed below a predetermined speed and the charging rate of the secondary battery is the predetermined value or more in a low-temperature environment in which the external temperature is a predetermined temperature or less, the switching mechanism is preferably switched to the state in which the rotor of the electric motor is connected to the first element of the planetary gear mechanism.

In the case where warm-up is insufficient due to a low-temperature environment in which the external temperature is the predetermined temperature or below in a cold area or the like and the vehicle is traveling at a low speed below the predetermined speed, there is a danger in that an engine stall (engine failure), in which the internal combustion engine stops, occurs regardless of the intention of a driver. In this case, as described above, setting the switching mechanism to the mode, in which the rotor of the electric motor is connected to the first element of the planetary gear mechanism, allows the electric motor and the internal combustion engine to be directly connected through the intermediary of the first element and the first clutch, thus making it possible to prevent the occurrence of the engine stall by using the driving force of the electric motor.

MODE FOR CARRYING OUT THE INVENTION

Figure 1:
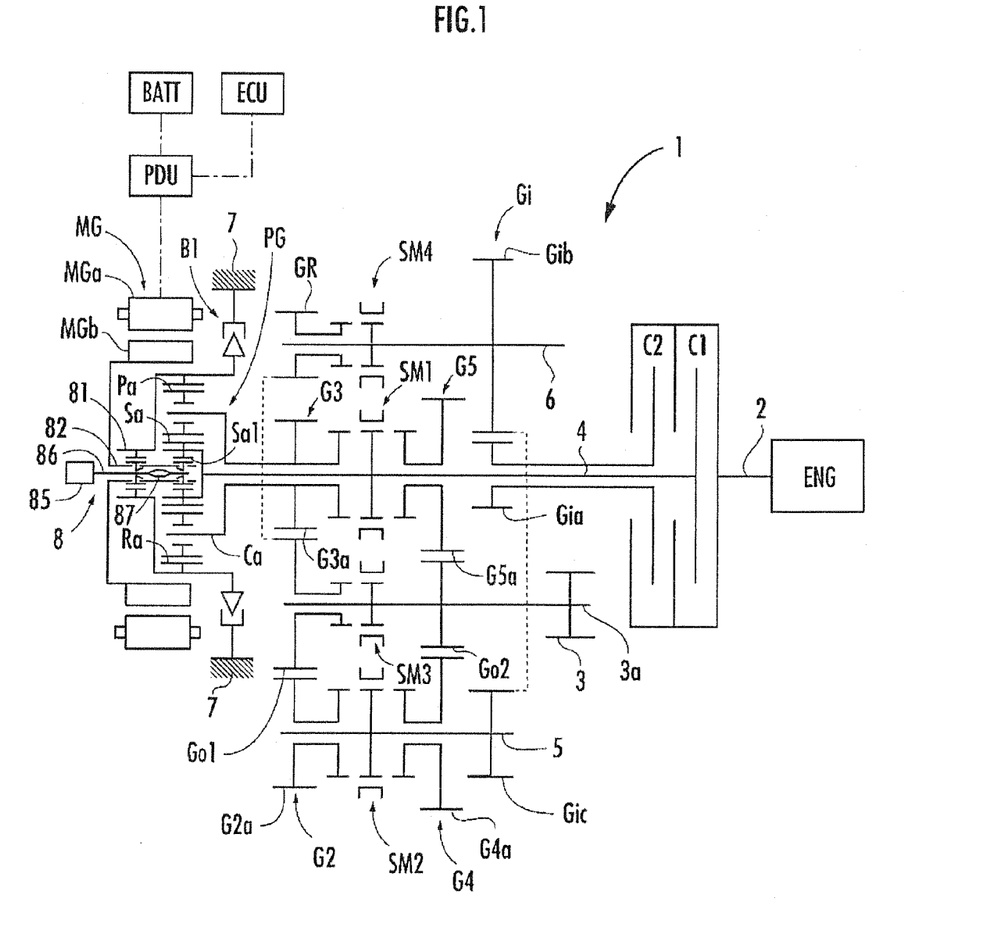
FIG. 1 It is a skeleton diagram illustrating an embodiment of the automatic transmission according to the present invention.

Referring to the drawings, an embodiment of the automatic transmission according to the present invention will be explained. An automatic transmission 1 illustrated in FIG. 1 is equipped with an input shaft 2 to which the power of an internal combustion engine ENG composed of an engine is transmitted, an output member 3 constituted by an output gear which outputs the power to right and left front wheels serving as drive wheels through the intermediary of a differential gear, which is not shown, and a plurality of gear trains G2 to G5 having different transmission gear ratios.

Further, the automatic transmission 1 includes a first drive gear shaft 4, which rotatably supports drive gears G3a and G5a of gear trains G3 and G5 of gear shift stages of odd ordinals in a transmission gear ratio rank order, a second drive gear shaft 5, which rotatably supports drive gears G2a and G4a of gear trains G2 and G4 of gear shift stages of even ordinals in the transmission gear ratio rank order, and a reverse shaft 6, which rotatably supports a reverse gear GR.

Further, the automatic transmission 1 includes an idle gear train Gi constituted by an idle drive gear Gia rotatably supported by the first drive gear shaft 4, a first idle driven gear Gib, which is fixed to the reverse shaft 6 and which engages the idle drive gear Gia, and a second idle driven gear Gic, which is fixed to the second drive gear shaft 5.

The first drive gear shaft 4 is disposed on the same axial line as the input shaft 2, while the second drive gear shaft 5 is disposed in parallel to the first drive gear shaft 4. The rotation of the input shaft 2 is disengageably transmitted to the first drive gear shaft 4 through the first clutch C1. Further, the rotation of the input shaft 2 is disengageably transmitted to the idle drive gear Gia through the second clutch C2. In other words, the rotation of the input shaft 2 is disengageably transmitted to the second drive gear shaft 5 through the second clutch C2 and the idle gear train Gi.

Further, a planetary gear mechanism PG is disposed coaxially with the input shaft 2. The planetary gear mechanism PG is a single pinion type composed of a sun gear Sa, a ring gear Ra, a sun gear Sa, and a carrier Ca, which rotatably supports a pinion Pa engaging with the sun gear Sa and the ring gear Ra such that these gears rotate on their axes and revolve in an orbital motion.

Figure 5:
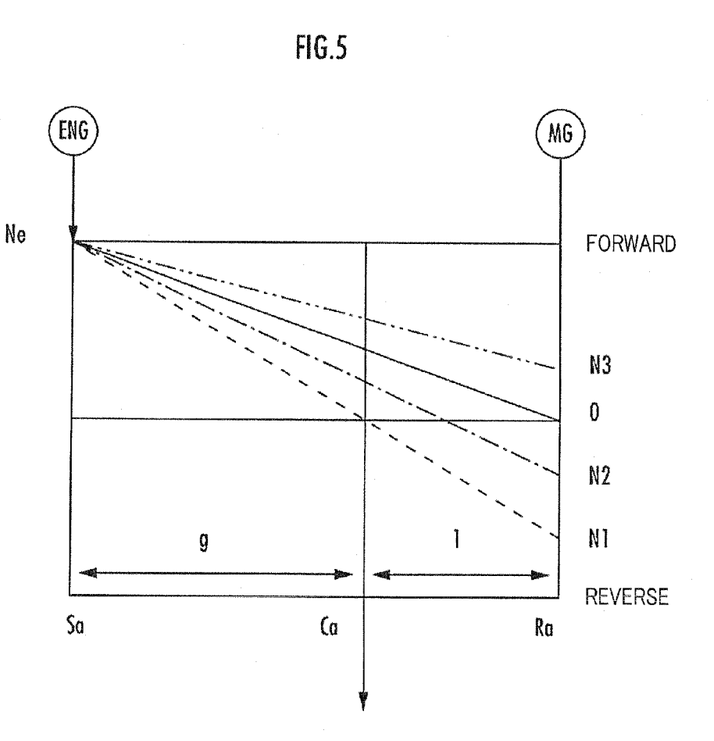
FIG. 5 It is a velocity diagram illustrating a planetary gear mechanism at a first gear shift stage of the embodiment.

If three elements composed of the sun gear Sa, the carrier Ca, and the ring gear Ra of the planetary gear mechanism PG are defined as a first element, a second element and a third element from the left side in the order in which they are arranged at intervals corresponding to gear ratios in the velocity diagram shown in FIG. 5, then the first element corresponds to the sun gear Sa, the second element corresponds to the carrier Ca, and the third element corresponds to the ring gear Ra.

The sun gear Sa serving as the first element is secured to the first drive gear shaft 4. The carrier Ca serving as the second element is connected to a 3rd-speed drive gear G3a of a 3rd-speed gear train G3. The ring gear Ra serving as the third element is disengageably fixed to a transmission case 7 by a brake B1.

The brake B1 is constituted by a two-way clutch which can be switched between a state in which forward rotation (the rotation in the advancing direction) is allowed and reverse rotation (rotation in the reverse direction) is blocked and a state in which the forward rotation is blocked while the reverse rotation is allowed. The brake B1 is not limited to the two-way clutch and may alternatively be constituted by other types, including a wet multi-plate brake, a hub brake, and a band brake.

A hollow electric motor MG (motor/generator) is disposed on the outer side in the radial direction of the planetary gear mechanism PG. In other words, the planetary gear mechanism PG is disposed on the inner side of the hollow electric motor MG. The electric motor MG has a stator MGa and a rotor MGb.

Further, the electric motor MG is controlled through the intermediary of a power drive unit PDU on the basis of instruction signals of a controller ECU. The controller ECU switches the power drive unit PDU, as necessary, between a drive mode in which the electric power of a secondary battery BATT is consumed to drive the electric motor MG and a regenerative mode in which electric power is generated while restraining the rotational force of a rotor MGb and the generated electric power is charged into the secondary battery BATT through the intermediary of the power drive unit PDU.

The automatic transmission 1 has a switching mechanism 8 which is capable of switching to one of a state in which the rotor MGb and the sun gear Sa are connected, a state in which the rotor MGb and the ring gear Rb are connected, and a state in which the rotor MGb is disengaged from the sun gear Sa and the ring gear Ra.

The reverse gear GR is rotatably supported by reverse shaft 6. A first driven gear Go1, which engages with a 2nd-speed drive gear G2a and a 3rd-speed drive gear G3a, is rotatably supported by an output shaft 3a, which rotatably supports the output member 3. Further, a second driven gear Go2, which engages with a 4th-speed drive gear G4a and a 5th-speed drive gear G5a, is fixed to the output shaft 3a.

Thus, constructing the driven gear of the 2nd-speed gear train G2 and the 3rd-speed gear train G3 and the driven gears of the 4th-speed gear train G4 and the 5th-speed gear train G5 by the single gear Go1 and the single gear Go2, respectively, makes it possible to shorten the axial length of the automatic transmission and thereby improving its mountability in an FF (front-wheel-drive) type vehicle.

The first drive gear shaft 4 has a first meshing mechanism SM1 which is composed of a synchromesh mechanism and which is capable of switching to one of a state in which the 3rd-speed drive gear G3a and the first drive gear shaft 4 are connected, a state in which the 5th-speed drive gear G5a and the first drive gear shaft 4 are connected, and a state in which the 3rd-speed drive gear G3a and the 5th-speed drive gear G5a are disconnected from the first drive gear shaft 4.

The second drive gear shaft 5 has a second meshing mechanism SM2 which is composed of a synchromesh mechanism and which is capable of switching to one of a state in which the 2nd-speed drive gear G2a and the second drive gear shaft 5 are connected, a state in which the 4th-speed drive gear G4a and the second drive gear shaft 5 are connected, and a state in which the 2nd-speed drive gear G2a and the 4th-speed drive gear G4a are disconnected from the second drive gear shaft 5.

The output shaft 3a has a third meshing mechanism SM3 which is composed of a synchromesh mechanism and which is capable of switching to either a state in which the first driven gear Go1 and the output shaft 3a are connected or a state in which the connection is released. The reverse shaft 6 has a fourth meshing mechanism SM4 which is composed of a synchromesh mechanism and which is capable of switching to either a state in which a reverse gear GR and the reverse shaft 6 are connected or a state in which the connection is released.

Referring now to FIG. 1 and FIG. 2, the switching mechanism 8 will be described. The sun gear Sa of the planetary gear mechanism PG is shaped to be cylindrical and provided with a first recessed portion Sa1 in its inner peripheral surface.

A connecting sleeve 81 disposed on the same axial line as the planetary gear mechanism PG is connected to the ring gear Ra. The inside diameter of the connecting sleeve 81 is set to be the same as the inside diameter of the cylindrical sun gear Sa. The inner peripheral surface of the connecting sleeve 81 is provided with a second recessed portion 81a.

A switching sleeve 82 connected to the rotor MGb of the electric motor MG is internally inserted in the connecting sleeve 81 and the sun gear Sa. The switching sleeve 82 has two, namely, a first and a second, through-holes 83a and 83b which penetrate in the radial direction, matching the positions of the recessed portions Sa1 and 81a, and which are provided with an interval therebetween in the axial direction of the switching sleeve 82. The first projecting member 84a is internally inserted in the first through-hole 83a and the second projecting member 84b is internally inserted in the second through-hole 83b.

A rod 86, which is moved forward/backward by a direct acting actuator 85 is internally inserted in the switching sleeve 82. The rod 86 has a diameter-expanded portion 87, one end of which in the axial direction is provided with a first tapered surface 87a while the other end of which in the axial direction is provided with a second tapered surface 87b. The rod 86 is normally disposed such that the diameter-expanded portion 87 is positioned between the first projecting member 84a and the second projecting member 84b.

The inner end portions of the projecting members 84a and 84b have tapered surfaces opposing the tapered surfaces 87a and 87b of the diameter-expanded portion 87. Further, the projecting members 84a and 84b are urged inward in the radial direction by the urging force of a spring, which is an elastic member, so that the projecting members are normally in a non-projecting state in which they do not jut out of the through-holes 83a and 83b (refer to FIG. 2(a)).

Figure 2A:
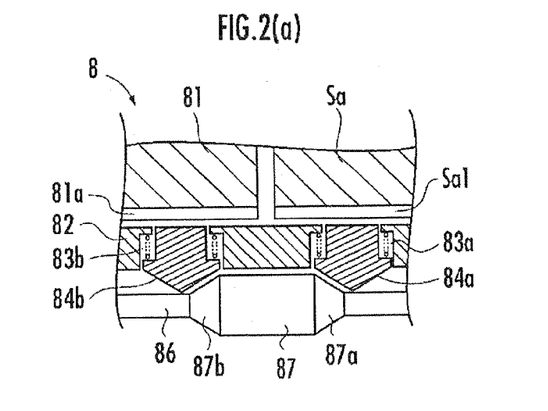
FIG. 2 It is an explanatory diagram illustrating a switching mechanism of the embodiment.
Figure 2B:
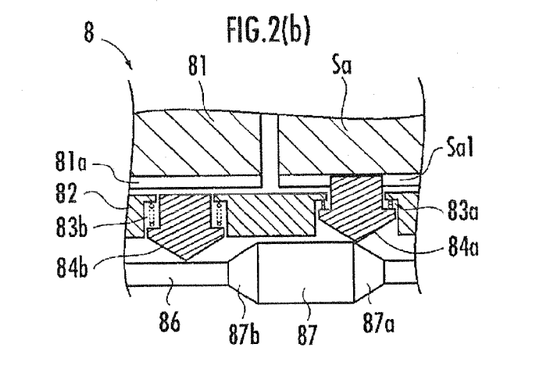

As illustrated in FIG. 2(b), as the rod 86 is pushed toward the internal combustion engine ENG by the direct acting actuator 85, the first tapered surface 87a of the diameter-expanded portion 87 causes the first projecting member 84a to jut out outward in the radial direction against the urging force of the spring. This causes the first projecting member 84a and the first recessed portion Sa1 to be engaged, thus connecting the rotor MGb with the sun gear Sa.

Figure 2C:
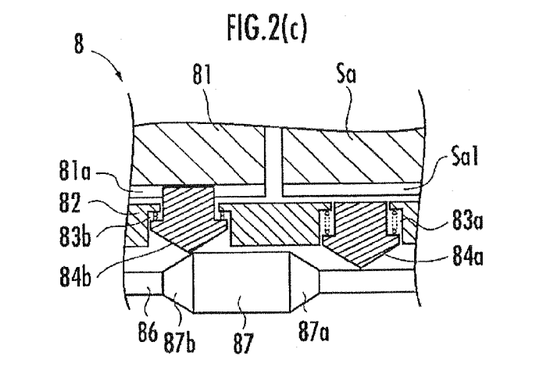

Conversely, as illustrated in FIG. 2(c), as the rod 86 is retreated by the direct acting actuator 85, the second tapered surface 87b of the diameter-expanded portion 87 causes the second projecting member 84b to jut out outward in the radial direction against the urging force of the spring. This causes the second projecting member 84b and the second recessed portion 81a to be engaged, thus connecting the rotor MGb with the ring gear Ra.

Further, as illustrated in FIG. 2(a), if the rod 86 is positioned by the direct acting actuator 85 such that both of the tapered surfaces 87a and 87b of the diameter-expanded portion 87 are positioned so as not to be in contact with neither of the projecting members 84a and 84b, then the connection between the planetary gear mechanism PG and the rotor MGb is released.

Further, the automatic transmission 1 according to the present embodiment has a rotational speed detecting mechanism (not shown) which detects the rotational speed of the rotor MGb. The rotational speed of the rotor MGb detected by the rotational speed detecting mechanism is sent to the controller ECU. If the rotational speed of the rotor MGb detected by the rotational speed detecting mechanism is an abnormal rotational speed, then the controller ECU determines that the electric motor MG is faulty and sets the switching mechanism 8 to the state in which the connection between the planetary gear mechanism PG and the rotor MGb is released. This allows the travel on the internal combustion engine ENG to be carried out without being affected by the faulty electric motor MG. In the present embodiment, the revolution detecting mechanism and the controller ECU constitute a failure detecting mechanism in the present invention.

The failure detecting mechanism may use a different construction as long as it is capable of detecting a failure of the electric motor MG. For example, in place of the revolution detecting mechanism, a temperature measuring mechanism that measures the temperature of the electric motor MG may be used, so that the controller ECU switches the switching mechanism 8 to the state in which the connection between the planetary gear mechanism PG and the rotor MGb is released if the temperature measured by the temperature measuring mechanism is an abnormal temperature.

The switching mechanism 8 is not limited to the one in the present embodiment illustrated in FIG. 2 and may use a different construction as long as it can be switched. For example, a cam mechanism may be used to change the phase of a rotational direction so as to switch among the state in which the first projecting member 84a juts out, the state in which the second projecting member 84b juts out, and the state in which neither of the first and the second projecting members 84a and 84b juts out.

An example of the switching mechanism 8 that uses the cam mechanism will be described with reference to FIG. 3 and FIG. 4. The same components as those of the switching mechanism 8 illustrated in FIG. 2 will be assigned the same reference numerals and the descriptions thereof will be omitted.

Figure 3:
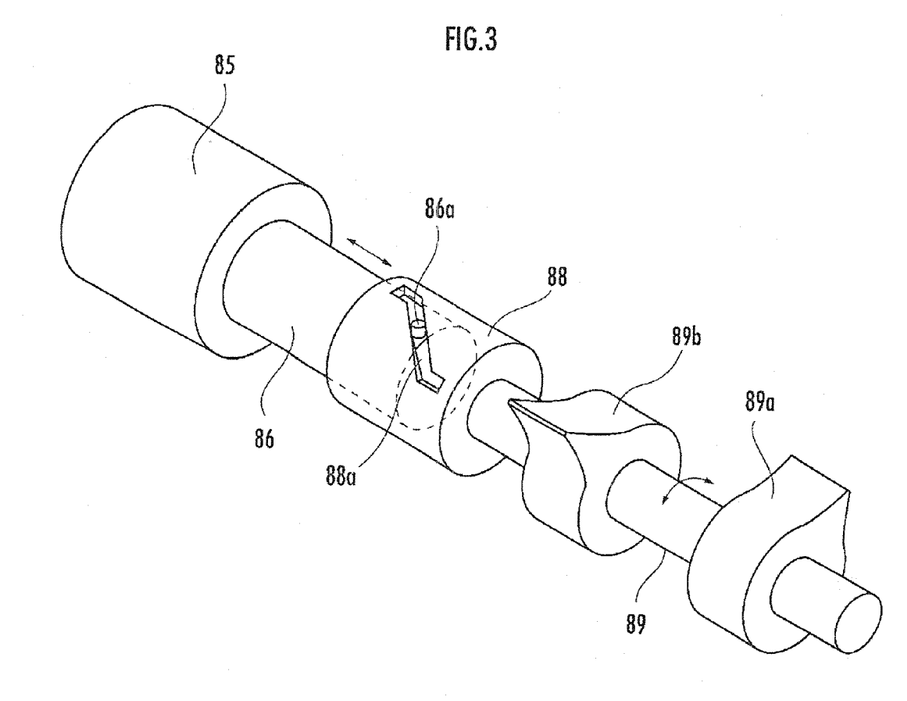
FIG. 3 It is an explanatory diagram illustrating a modification example of the switching mechanism of the embodiment.

The switching mechanism 8 that uses the cam mechanism illustrated in FIG. 3 and FIG. 4 has a cylindrical grooved cam 88 into which the distal portion of a rod 86, which can be moved forward/backward by a direct acting actuator 85, is slidably inserted. A cam groove 88a having its peripheral surface cut aslant is formed in the cylindrical grooved cam 88. Further, the distal end of the rod 86 is provided with a protrusion 86a that is positioned in the cam groove 88a and juts out.

A cam shaft 89 is extendedly provided on the end portion of the cylindrical grooved cam 88 adjacent to the internal combustion engine ENG. The cam shaft 89 is rotatably inserted into a switching sleeve 82 such that the cam shaft 89 is blocked from moving in the axial direction. The cam shaft 89 has a first plate cam 89a fixed thereto at a position matching a first projecting member 84a and a second plate cam 89b fixed thereto at a position matching a second projecting member 84b.

Figure 4A:
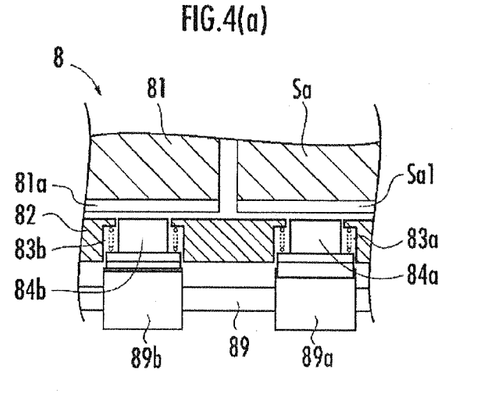
FIG. 4 It is an explanatory diagram illustrating the movement of the modification example of the switching mechanism of the embodiment.
Figure 4B:
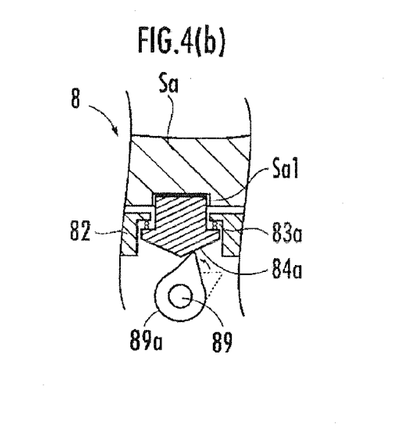
Figure 4C:
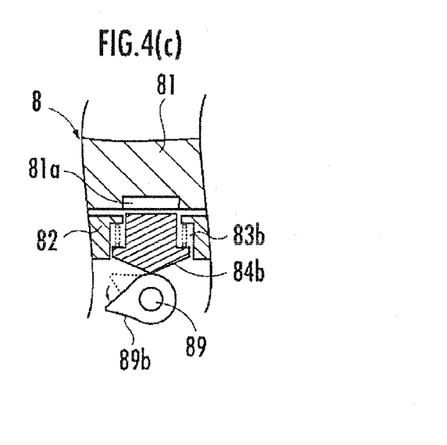

When the rod 86 is retreated by the direct acting actuator 85, the cam shaft 89 is rotated by a cylindrical grooved cam 88 and a protrusion 86a and the first plate cam 89a pushes out a first projecting member 84a outward in the radial direction against the urging force of a spring, causing the first projecting member 84a to engage with a first recessed portion Sa1, as illustrated in FIG. 4(b). At this time, a second projecting member 84b is not pushed out by a second plate cam 89b and does not engage with a second recessed portion 81a, as illustrated in FIG. 4(c). This state corresponds to a first phase in the present invention.

Figure 4D:
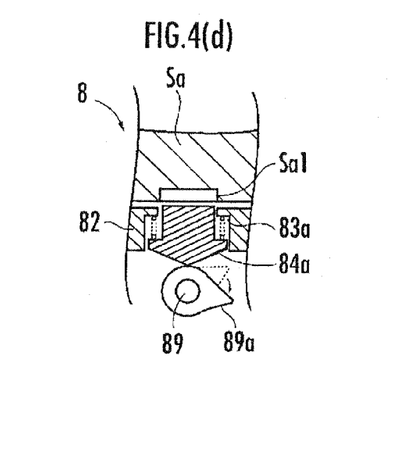
Figure 4E:
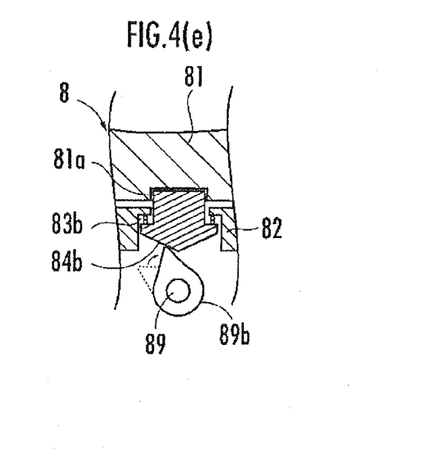

Conversely, when the rod 86 is advanced by the direct acting actuator 85, the cam shaft 89 is rotated in the opposite direction by the cylindrical grooved cam 88 and the protrusion 86a and the second plate cam 89b pushes out a second projecting member 84b outward in the radial direction against the urging force of the spring, causing the second projecting member 84b to engage with a second recessed portion 81a, as illustrated in FIG. 4(e). At this time, the first projecting member 84a is not pushed out by the first plate cam 89a and does not engage with the first recessed portion Sa1, as illustrated in FIG. 4(d). This state corresponds to a second phase in the present invention.

Positioning the rod 86 by the direct acting actuator 85 such that the protrusion 86a is disposed at the center in the axial direction of the cam groove 88a engages a state in which both of the two projecting members 84a and 84b do not engage with the two recessed portions Sa1 and 81a, as illustrated in FIG. 4(a).

The operation of an automatic transmission 1 constructed as described above will now be explained. In the automatic transmission 1 according to the present embodiment, when the vehicle is in a parked state, the switching mechanism 8 is set to a state in which an electric motor MG and a sun gear Sa are connected and a first clutch C1 is engaged, thereby making it possible to start the internal combustion engine ENG by driving the electric motor MG.

First, to establish a 1st-gear speed by using the driving force of the internal combustion engine ENG, the third meshing mechanism SM3 is set to a state in which a first driven gear Go1 and an output shaft 3a are connected, a ring gear Ra of a planetary gear mechanism PG is locked to a transmission case 7 by a brake B1, and the first clutch C1 is engaged.

The driving force of the internal combustion engine ENG is input to the sun gear Sa of the planetary gear mechanism PG through the intermediary of an input shaft 2, the first clutch C1, and a first drive gear shaft 4. The rotational speed of the internal combustion engine ENG input to the input shaft 2 is reduced to 1/(g+1), the gear ratio of the planetary gear mechanism PG (the number of teeth of the ring gear Ra/the number of teeth of the sun gear Sa) being denoted by g, and the reduced rotational speed is transmitted to a 3rd-speed drive gear G3a via a carrier Ca.

Denoting the gear ratio of a 3rd-speed gear train G3 composed of the 3rd-speed drive gear G3a and the first driven gear Go1 (the number of teeth of the 3rd-speed drive gear G3a/the number of teeth of the first driven gear Go1) by i, the reduced rotational speed is shifted to 1/i(g+1) and then output from an output member 3, thus establishing the 1st speed stage.

At the 1st speed stage, if the electric motor MG is not used, the switching mechanism 8 is set to the state in which the connection between the sun gear Sa and the ring gear Ra is released. This makes it possible to prevent a rotation loss attributable to the inertia of the electric motor MG.

The switching mechanism 8 may be set also to the state in which the connection between the sun gear Sa and the ring gear Ra is released in the case where a failure of the electric motor MG has been detected.

When regenerative drive is performed, the electric motor MG is connected to the sun gear Sa by the switching mechanism 8 and the brake is applied by the electric motor MG, thus allowing regeneration to be implemented.

Further, in the state wherein the electric motor MG and the sun gear Sa are connected by the switching mechanism 8, the electric motor MG is driven so as to permit an assist travel in which the driving force of the internal combustion engine ENG is assisted or an EV (Electric Vehicle) travel in which the vehicle travels solely on the driving force of the electric motor MG.

Further, in the case where the vehicle speed is a predetermined speed or more during an EV travel, the internal combustion engine ENG can be started by engaging the first clutch C1.

In addition, the regenerative drive can be performed by releasing the lock of the ring gear Ra by the brake B1 and connecting the electric motor MG with the ring gear Ra by the switching mechanism 8. In the case where the lock of the ring gear Ra by the brake B1 is released and the electric motor MG is in connection with the ring gear Ra, the carrier Ca to be connected to the output member 3 will have an inertia that is far more than that of the ring gear Ra with which the electric motor MG has been connected.

Therefore, at the time of a start, as indicated by the dashed line in the velocity diagram of the planetary gear mechanism PG in FIG. 5, the rotational speed of the carrier Ca becomes approximately zero relative to a rotational speed Ne of the sun gear Sa to which the power of the internal combustion engine ENG is transmitted, causing the ring gear Ra to reversely rotate (rotation in the reverse direction, which is indicated by N1 in FIG. 5). Then, brakes are applied by the electric motor MG such that the rotational speed of the ring gear Ra changes from N1 to N2 to generate electric power so as to perform regenerative drive, thereby generating a driving force for the forward rotation (in the advancing direction) in the carrier Ca (refer to the chain line in FIG. 5).

This arrangement makes it possible to establish a startup stage which provides a lower output speed than a standard 1st speed stage but a larger driving force (torque).

Further, when a driving force for the forward rotation is generated by the electric motor MG, the driving force of the internal combustion engine ENG and the driving force of the electric motor MG are combined by the carrier Ca and output from the output member 3. This permits easy output of a larger driving force, making it possible to improve the capability of following an operation by a driver (drivability).

If the controller ECU predicts while traveling at the 1st speed stage that the 1st speed stage will be shifted to the 2nd speed stage on the basis of vehicle information or the like, such as a vehicle speed, then the controller ECU sets a second meshing mechanism SM2 to a state in which a 2nd-speed drive gear G2a and a second drive gear shaft 5 are connected or a pre-shift state approximating to the aforesaid state.

Further, in the automatic transmission 1 according to the present embodiment, a gear ratio g of the planetary gear mechanism PG and a gear ratio i of a 3rd-speed gear train G3 are set to relatively small values, placing an emphasis on fuel efficiency. In addition, when carrying out assist travel, based on vehicle information, such as the amount of depression on a gas pedal, the controller ECU connects a rotor MGb of the electric motor MG to the sun gear Sa to implement the assist travel when starting the vehicle with an emphasis placed on fuel efficiency, or connects the rotor MGb of the electric motor MG to the ring gear Ra to implement the assist travel when starting the vehicle with an emphasis placed on the driving force (torque).

To establish the 2nd speed stage by using the driving force of the internal combustion engine ENG, the second meshing mechanism SM2 is connected to the 2nd-speed drive gear G2a and the second drive gear shaft 5, the third meshing mechanism SM3 is connected to a first driven gear Go1 and an output shaft 3a, and then a second clutch C2 is engaged.

When the controller ECU predicts a shift-up, the controller ECU engages a state in which a first meshing mechanism SM1 is connected to a 3rd-speed drive gear G3a and a first drive gear shaft 4 or the pre-shift state approximating to the aforesaid state.

When the vehicle is decelerating and a charging rate SOC of a secondary battery BATT is below a predetermined value, the controller ECU carries out decelerative regeneration. To implement 2nd-speed-stage decelerative regeneration, a brake B1 is engaged and electric power is generated by the electric motor MG, in which the carrier Ca that rotates together with the 3rd-speed drive gear G3a meshing with the first driven gear Go1 is connected to the sun gear Sa by the switching mechanism 8, thereby carrying out the regeneration while applying brakes.

Alternatively, in the case where the controller ECU predicts a shift-up, the first meshing mechanism SM1 may be set to the state in which the 3rd-speed drive gear G3a and the first drive gear shaft 4 are connected, the three elements of the planetary gear mechanism PG may be set in a locked state so that they cannot relatively rotate, the electric motor MG may be connected to the sun gear Sa or the ring gear Ra by the switching mechanism 8, and the decelerative regeneration may be carried out while applying brakes by the electric motor MG.

Thus, even if the vehicle immediately shifts from the decelerating state to an accelerating state, a prompt shift-up to the 3rd speed stage can be achieved.

Further, to carry out the assist travel by the electric motor MG, the first meshing mechanism SM1 is set to the state in which the 3rd-speed drive gear G3a and the first drive gear shaft 4 are connected, the planetary gear mechanism PG is locked, the electric motor MG is connected to the sun gear Sa or the ring gear Ra by the switching mechanism 8, and the driving force of the electric motor MG is transmitted to the output member 3 through the intermediary of a 3rd-speed gear train G3.

To establish the 3rd speed stage by using the driving force of the internal combustion engine ENG, the first meshing mechanism SM1 is set to the state in which the 3rd-speed drive gear G3a and the first drive gear shaft 4 are connected and the first clutch C1 is engaged. This causes the driving force of the internal combustion engine ENG to be transmitted to the output member 3 through the intermediary of an input shaft 2, the first clutch C1, the first drive gear shaft 4, the first meshing mechanism SM1, and the 3rd-speed gear train G3, and then output at a rotational speed of 1/i.

At the 3rd speed stage, the first meshing mechanism SM1 has the 3rd-speed drive gear G3a connected with the first drive gear shaft 4, so that the sun gear Sa and the carrier Ca of the planetary gear mechanism PG share the same rotation. Hence, each element of the planetary gear mechanism PG is in the locked state wherein they cannot relatively rotate, so that the decelerative regeneration is implemented by using the electric motor MG to apply brakes to the sun gear Sa or the ring gear Ra by the switching mechanism 8, and transmitting the driving force to the sun gear Sa or the ring gear Ra by the electric motor MG allows the assist travel to be accomplished.

Further, it is also possible to implement the EV in which the vehicle travels solely on the driving force of the electric motor MG, releasing the first clutch C1.

If the controller ECU predicts a shift-down on the basis of vehicle information, then the second meshing mechanism SM2 is set to a state in which a 2nd-speed drive gear G2a and a second drive gear shaft 5 are connected or to the pre-shift state approximating to the aforesaid state. If a shift-up is predicted, then the second meshing mechanism SM2 is set to a state in which a 4th-speed drive gear G4a and the second drive gear shaft 5 are connected or the pre-shift state approximating to the aforesaid state. This makes it possible to switch gears simply by engaging the second clutch C2 and releasing the first clutch C1, thus permitting smooth speed changes.

To establish a 4th speed stage by using the driving force of the internal combustion engine ENG, the second meshing mechanism SM2 is set to connect the 4th-speed drive gear G4a and the second drive gear shaft 5, engaging the second clutch C2.

During a travel at the 4th speed stage, if the controller ECU predicts a shift-down on the basis of vehicle information, then the first meshing mechanism SM1 is set to the state in which the 3rd-speed drive gear G3a and the first drive gear shaft 4 are connected or to the pre-shift state approximating to the aforesaid state, and the third meshing mechanism SM3 is set to a state in which the first driven gear Go1 and the output shaft 3a are connected.

Conversely, if the controller ECU predicts a shift-up on the basis of vehicle information, then the first meshing mechanism SM1 is set to a state in which a 5th-speed drive gear G5a and the first drive gear shaft 4 are connected or to the pre-shift state approximating to the aforesaid state. This makes it possible to accomplish the shift-down or the shift-up simply by engaging the first clutch C1 and releasing the second clutch C2, thus permitting smooth speed changes.

In the case where the decelerative regeneration or the assist travel is carried out during a 4th-speed-stage travel, if the controller ECU predicts a shift-down, then the first meshing mechanism SM1 is set to connect the 3rd-speed drive gear G3a and the first drive gear shaft 4 and the third meshing mechanism SM3 is set to connect the first driven gear Go1 and the output shaft 3a.

Further, to carry out the decelerative regeneration, brakes are applied by the electric motor MG to implement the decelerative regeneration. At this time, the planetary gear mechanism PG is in the locked state, so that the switching mechanism 8 simply connects the rotor MGb to the sun gear Sa or the ring gear Ra.

To carry out the assist travel, the electric motor MG is driven and the driving force of the electric motor MG is transmitted to the output member 3 through the intermediary of the first drive gear shaft 4 and the 3rd-speed gear train.

When the controller ECU predicts a shift-up, the first meshing mechanism SM1 is set to connect the 5th-speed drive gear G5a and the first drive gear shaft 4 and the switching mechanism 8 is set to connect the rotor MGb of the electric motor MG and the sun gear Sa.

Further, to carry out the decelerative regeneration, brakes are applied by the electric motor MG to implement the decelerative regeneration. To carry out the assist travel, the driving force of the electric motor MG is transmitted to the output member 3 through the intermediary of the sun gear Sa, the first drive gear shaft 4, and the 5th-speed gear train.

To establish the 5th speed stage by using the driving force of the internal combustion engine ENG, the first meshing mechanism SM1 is set to connect the 5th-speed drive gear G5a and the first drive gear shaft 4.

To carry out regeneration or the assist travel by using the electric motor MG, or to carry out the EV travel by using only the driving force of the electric motor MG, the switching mechanism 8 is set to connect the rotor MGb of the electric motor MG to the sun gear Sa. To carry out the EV travel, the first clutch C1 is released. During the EV travel at the 5th speed stage, the internal combustion engine ENG can be started by gradually engaging the first clutch C1.

If a shift-down to the 4th speed stage is predicted from vehicle information during the travel at the 5th speed stage, then the controller ECU sets the second meshing mechanism SM2 to the state in which the 4th-speed drive gear G4a and the second drive gear shaft 5 are connected or a pre-shift state approximating to the aforesaid state. This permits a smooth shift-down to the 4th speed stage.

In the case where the shift-down to the 4th speed stage is not predicted from vehicle information during the travel at the 5th speed stage and the charging rate SOC of the secondary battery BATT is below a predetermined value, and the vehicle is accelerating or cruising (at a fixed speed), the controller ECU sets the second meshing mechanism SM2 to the state in which the 2nd-speed drive gear G2a and the second drive gear shaft 5 are connected and also sets the switching mechanism 8 in the state in which the rotor MGb and the ring gear Ra are connected, thus rotating the ring gear Ra at a predetermined rotational speed by the electric motor MG.

In this state, the second clutch C2 is engaged whereas the first clutch C1 is disengaged. This causes the driving force of the internal combustion engine ENG to be transmitted to the carrier Ca of the planetary gear mechanism PG through the intermediary of an idle gear train Gi, the second drive gear shaft 5, the second meshing mechanism SM2, the 2nd-speed gear train G2, and the 3rd-speed gear train G3.

At this time, carrying out the regeneration by generating electric power by the electric motor MG distributes the driving force of the internal combustion engine ENG to the sun gear Sa and the ring gear Ra connected to the output member 3. Further, in the velocity diagram of the planetary gear mechanism PG, the interval between the sun gear Sa and the carrier Ca is greater than the interval between the carrier Ca and the ring gear Ra, making it difficult to transmit the driving force of the internal combustion engine ENG, which is transmitted to the carrier Ca, to the sun gear Sa connected to the output member 3. This permits improved fuel efficiency at the 5th-speed stage.

Further, in the case where the shift-down to the 4th speed stage is not predicted from vehicle information during the EV travel at the 5th speed stage and the charging rate SOC of the secondary battery BATT is a predetermined value or more, and the vehicle is accelerating or cruising (at a fixed speed), the controller ECU may engage the first clutch C1 to start the internal combustion engine ENG thereby to switch to a mode of travel only on the driving force of the internal combustion engine ENG.

During the EV travel at the 5th speed stage, a brake B1 is engaged, the rotational speed of the ring gear Ra is set to zero, and the second meshing mechanism SM2 is set to the state in which the 2nd-speed drive gear G2a and the second drive gear shaft 5 are connected. Further, an assist travel in which the driving force of the electric motor MG is assisted by the driving force of the internal combustion engine ENG can be implemented by engaging the second clutch C2 to transmit the driving force of the internal combustion engine ENG to the carrier Ca.

To establish a reverse stage by using the driving force of the internal combustion engine ENG, a third meshing mechanism SM3 is set to a state in which the 2nd-speed drive gear G2b and the output shaft 3a are connected and a fourth meshing mechanism SM4 is set to a state in which a reverse gear GR and a reverse shaft 6 are connected, and then the second clutch C2 is engaged. This changes the rotational speed of the input shaft 2 to a negative rotation (rotation in the reverse direction) of the rotational speed of [the number of teeth of an idle drive gear Gia/the number of teeth of a 1st idle driven gear Gib]× [the number of teeth of the reverse gear GR/the number of teeth of the first driven gear Go1] and the resulting rotational speed is output from the output member 3.

To carry out the decelerative regeneration or the assist travel at the reverse stage, the first meshing mechanism SM1 is set to the state in which the 3rd-speed drive gear G3a and the first drive gear shaft 4 are connected, and the planetary gear mechanism PG is locked. Then, causing the rotor MGb rotating in the reverse direction to generate a driving force on a forward rotation side (applying brakes) implements the decelerative regeneration, while causing the rotor MGb to generate a driving force on a reverse rotation side implements the assist travel.

According to the automatic transmission 1 of the present embodiment, the switching mechanism 8 permits switching among the state in which the electric motor MG is connected to the sun gear Sa, the state in which the electric motor MG is connected to the ring gear Ra, and the state in which the electric motor MG is isolated from the planetary gear mechanism PG.

Thus, at the 1st speed stage, even if the charging rate SOC of the secondary battery BATT is below a predetermined value, the vehicle can be started while carrying out regeneration by connecting the electric motor MG to the ring gear Ra by the switching mechanism 8.

Further, as indicated by the chain line in FIG. 5, it is possible to establish a start stage with a lower output rotational speed than the standard 1st speed stage indicated by the solid line in FIG. 5. This allows a proper start stage to be selected according to a vehicle condition, thus permitting an improved capability of following an operation by a driver (drivability) and also improved fuel efficiency.

The invention claimed is:

1. An automatic transmission for a hybrid vehicle having an internal combustion engine and an electric motor, which processes the rotation of an input shaft, to which the power of the internal combustion engine is transmitted, into speeds of a plurality of gear shift stages through the intermediary of a plurality of gear trains and outputs the resulting rotation from an output member, the automatic transmission comprising:

a first drive gear shaft rotatably supporting a drive gear of each gear train which establishes a gear shift stage of an odd ordinal in a transmission gear ratio rank order;

a second drive gear shaft rotatably supporting a drive gear of each gear train which establishes a gear shift stage of an even ordinal in a transmission gear ratio rank order;

a first clutch that disconnectably connects the input shaft and the first drive gear shaft;

a second clutch that disconnectably connects the input shaft and the second drive gear shaft;

a first meshing mechanism, which selectively connects a drive gear of each gear train which establishes a gear shift stage of an odd ordinal in a transmission gear ratio rank order, to the first drive gear shaft;

a second meshing mechanism, which selectively connects a drive gear of each gear train which establishes a gear shift stage of an even ordinal in a transmission gear ratio rank order, to the second drive gear shaft;

a planetary gear mechanism having three elements, namely, a sun gear, a carrier, and a ring gear;

the three elements composed of the sun gear, the carrier, and the ring gear of the planetary gear mechanism being defined as a first element, a second element, and a third element, respectively, in an order of the arrangement at intervals corresponding to gear ratios in a velocity diagram;

a brake which disengageably locks the third element to a transmission case; and a switching mechanism which switches between a state in which a rotor of the electric motor is connected to the first element of the planetary gear mechanism and a state in which the rotor of the electric motor is connected to the third element of the planetary gear mechanism, wherein the first element and the first drive gear shaft are connected, and the second element and one of drive gears rotatably supported by the first drive gear shaft are connected.

2. The automatic transmission according to claim 1, wherein the switching mechanism is configured to enable switching to a state in which connection with the first element or the third element of the planetary gear mechanism is cleared.

3. The automatic transmission according to claim 2, further comprising:

a failure detecting mechanism which detects a failure of the electric motor, wherein in the case where the failure detecting mechanism detects a failure of the electric motor, the switching mechanism switches to the state in which connection with the first element or the third element of the planetary gear mechanism is cleared.

4. The automatic transmission according to claim 1, wherein the switching mechanism comprises a switching sleeve and a rod which can be moved forward and backward in the switching sleeve by a direct acting actuator, the switching sleeve and the rotor of the electric motor are connected, the switching sleeve has two, namely, a first and a second, through-holes which penetrate in a radial direction and which are provided with an interval therebetween in the axial direction of the switching sleeve, a first projecting member being internally inserted in the first through-hole, and a second projecting member being internally inserted in the second through-hole, an elastic member urging the projecting member inward in the radial direction is disposed in each of the two through-holes, the rod is provided with a diameter-expanded portion which gradually expands outward in the radial direction so as to form two, namely, a first and a second, tapered surfaces, the rod is moved forward or backward by the direct acting actuator to cause the first tapered surface to come in contact with the first projecting member, thus causing the first projecting member to jut out of the switching sleeve outward in the radial direction against an urging force of the elastic member and the first projecting member to engage with a first recessed portion connected to the first element of the planetary gear mechanism, thereby setting the switching mechanism to a state in which the rotor of the electric motor is connected with the first element, and the rod is moved backward or forward by the direct acting actuator to cause the second tapered surface to come in contact with the second projecting member, thus causing the second projecting member to jut out of the switching sleeve outward in the radial direction against an urging force of the elastic member and the second projecting member to engage with a second recessed portion connected to the third element of the planetary gear mechanism, thereby setting the switching mechanism to a state in which the rotor of the electric motor is connected with the third element.

5. The automatic transmission according to claim 1, wherein the switching mechanism comprises a switching sleeve, a rod which can be moved forward and backward in the axial direction by a direct acting actuator, a cylindrical grooved cam which switches the forward/backward motion of the rod to a rotational motion, and a cam shaft which is connected to the cylindrical grooved cam and to which two, namely, a first and a second, plate cams are secured, the switching sleeve and the rotor of the electric motor are connected, the switching sleeve is provided with two, namely, a first and a second, through-holes which penetrate in the radial direction and which are provided with an interval therebetween in the axial direction, a first projecting member being internally inserted in the first through-hole, while a second projecting member being internally inserted in the second through-hole, an elastic member urging the projecting member inward in the radial direction is disposed in each of the two through-holes, and the cylindrical grooved cam is configured to be capable of switching by the forward/backward motion of the rod to a first phase in which the first plate cam causes the first projecting member to project against the urging force of the elastic member so that the first projecting member engages with a first recessed portion connected to the first element of the planetary gear mechanism, or to a second phase in which the second plate cam causes the second projecting member to project against the urging force of the elastic member so that the second projecting member engages with a second recessed portion connected to the third element of the planetary gear mechanism.

6. The automatic transmission according to claim 1, wherein in the case where a charging rate of a secondary battery is below a predetermined value and the vehicle is to be started using the driving force of the internal combustion engine, the switching mechanism is switched to the state in which the rotor of the electric motor is connected to the third element of the planetary gear mechanism, the first clutch is engaged to transmit the driving force of the internal combustion engine to the first element of the planetary gear mechanism, and the rotation of the third element that reversely rotates is restrained by the electric motor, and power is output from the output member through the intermediary of the second element and a gear train having a drive gear connected thereto.

7. The automatic transmission according to claim 1, wherein in the case where the vehicle is traveling at a low speed below a predetermined speed and the charging rate of the secondary battery is the predetermined value or more in a low-temperature environment in which the external temperature is a predetermined temperature or less, the switching mechanism is switched to the state in which the rotor of the electric motor is connected to the first element of the planetary gear mechanism.

* * * * *